United States Patent [19]

Benson

[11] 4,090,498

[45] May 23, 1978

[54] SOLAR HEATER

[76] Inventor: Phillip D. Benson, 2026 E. Lakeshore Dr., Agoura, Calif. 91301

[21] Appl. No.: 727,470

[22] Filed: Sep. 28, 1976

[51] Int. Cl.² ........................... F24J 3/02; F03G 7/02
[52] U.S. Cl. .................................. 126/271; 126/270; 60/641
[58] Field of Search ............... 126/270, 271; 237/1 A; 60/641; 240/51.12, 41.1; 350/288, 289, 293; 250/203, 201, 202, 216, 234, 235, 236

[56] References Cited

U.S. PATENT DOCUMENTS

| 811,274 | 1/1906 | Carter | 126/271 |
|---|---|---|---|
| 1,696,003 | 12/1928 | Harvey | 126/271 |
| 3,200,820 | 8/1965 | Garrett | 126/271 |
| 3,254,644 | 6/1966 | Thannhauser | 126/271 |
| 3,453,425 | 7/1969 | Whitaker | 240/41.1 |
| 3,486,026 | 12/1969 | Bez | 250/203 R |
| 3,518,443 | 6/1970 | Engelmann | 250/203 R |
| 3,872,854 | 3/1975 | Raser | 126/270 |
| 3,954,097 | 5/1976 | Wilson, Jr. | 237/1 A |
| 4,002,032 | 1/1977 | Bash | 126/271 X |
| 4,010,614 | 3/1977 | Arthur | 60/641 |
| 4,013,885 | 3/1977 | Blitz | 250/203 R |

Primary Examiner—William F. O'Dea
Assistant Examiner—Larry Jones
Attorney, Agent, or Firm—Roger A. Marrs

[57] ABSTRACT

A solar heater is disclosed herein for increasing the temperature of water which provides a conical array of a tubular coil carried on a circular frame. Drive mechanism is operably coupled to the frame for maintaining the water conducting coil array substantially perpendicular to the impinging rays of the sun. A circular parabolic mirror is mounted on the frame beneath the conical coil array for redirecting the sun's rays passing through a central opening in the array to the underside of the water conducting coil while other rays of the sun directly strike the top side of the coil. The drive mechanism is controlled by an electrical circuit including a time clock, a motor, limit switches and several relays operably connected together to provide a controlled drive to achieve the sun-following feature.

4 Claims, 4 Drawing Figures

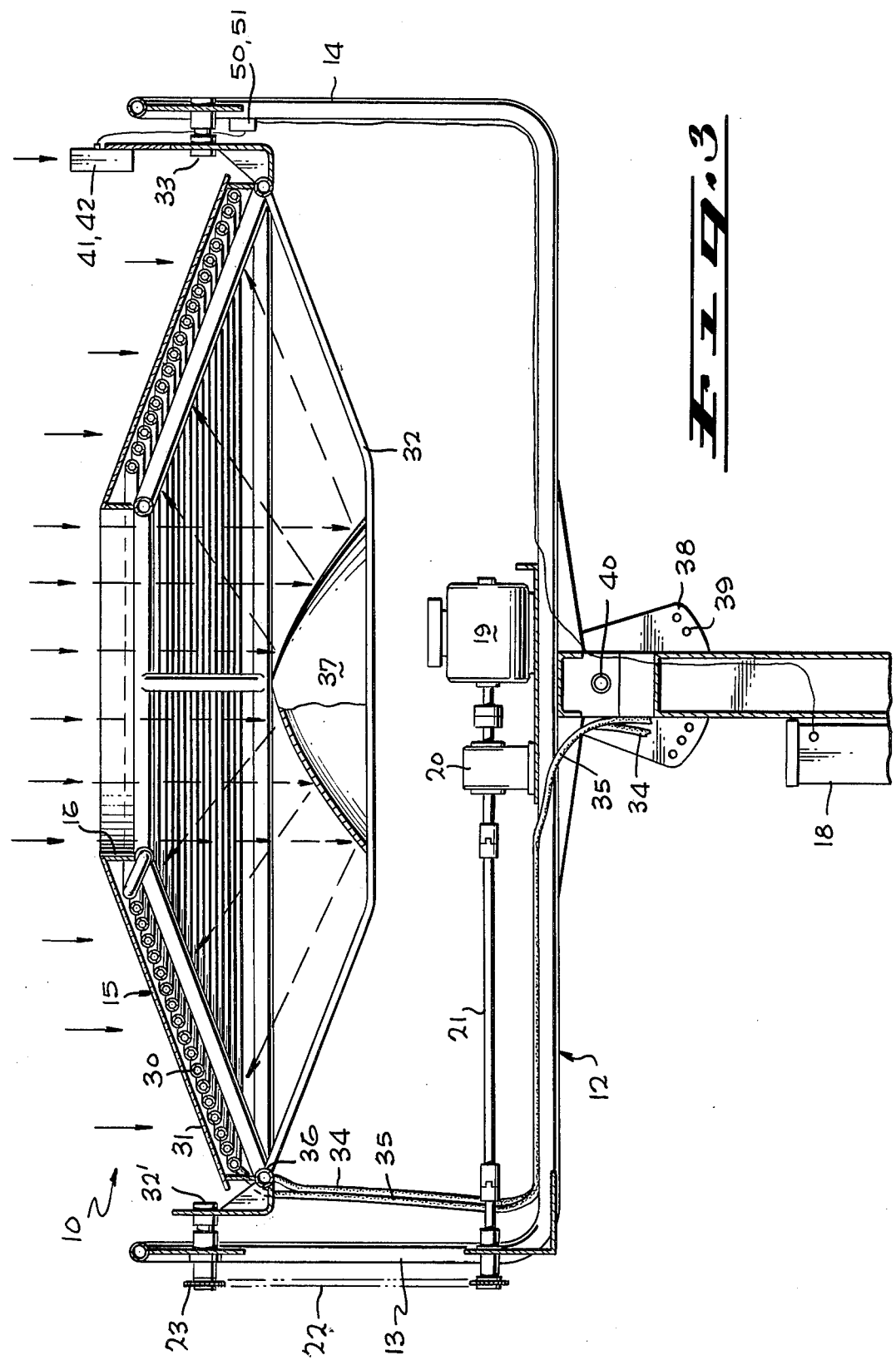

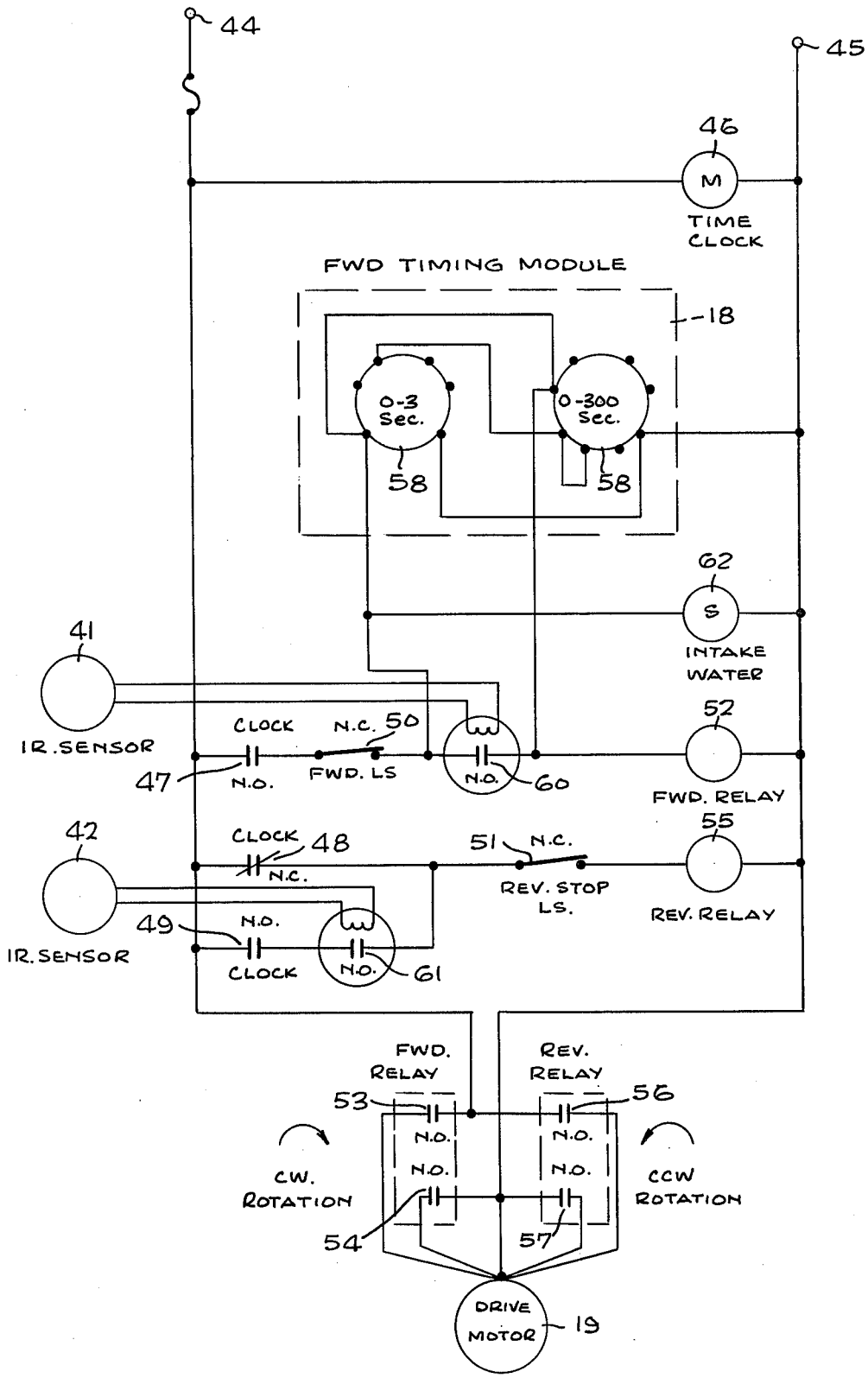

SOLAR HEATER

BACKGROUND OF THE INVENTION

1. Field of the Invention

This invention relates to the field of solar heaters for elevating the temperature of water and more particularly, to a novel solar water heating apparatus having increased sun ray gathering or collecting capabilities.

2. Brief Description of the Piror Art

In the past, solar heaters have been provided for increasing the temperature of water for household use. Such previous heaters generally employ solar collectors such as flexible absorbing plastic material, plastic panels or the like. Prior art conventional solar heaters are disclosed in U.S. Pat. Nos. 3,599,626; 3,467,840; and 3,466,119. Although these prior solar heaters do increase the temperature of water enclosed within the collector, a great portion of that heat energy is lost through the surrounding environment since some of the heat is reflected into the adjacent air and carried away by surface wind. Furthermore, the prior solar heaters do not take into account the movement of the sun during its daily travel about the earth. This travel directs the suns radiation at different angles to the solar collectors and inefficiencies in the heat transfer are encountered when the sun's rays are less than perpendicular or 90° to the collector.

Another difficulty encountered with prior solar heaters and collectors residues in the fact that only one side of the collector is exposed to the sun's radiation and no means are provided for exposing the opposite side of the collector to the sun's radiation at the same time that the first or top side is exposed. Therefore, great inefficiencies are encountered with the systems since only one half of the collector is exposed to the sun's radiation at a time.

Therefore, a long standing need has existed to provide a novel solar heating system or apparatus which includes means for moving the apparatus to maintain the collector perpendicular respective to the sun's radiation and to provide a collector which exposes maximum surface area to the sun's radiation.

SUMMARY OF THE INVENTION

Accordingly, the problems and difficulties encountered with prior solar heaters are obviated by the present invention which provides a novel solar heating construction for absorbing the heat of solar radiation and automatically transferring the heat to water or other suitable heat storage fluid. The solar heating apparatus includes a conical array of a tubular coil carried on a circular frame. The coil is arranged so as to define a central opening through which the suns radiation may pass. Drive mechanism is operably coupled between the frame and a support stanchion for maintaining the water conducting coil array substantially perpendicular to the impinging rays of the sun as the sun travels across the overhead sky. A circular parabolic mirror is mounted on the frame beneath the conical coil array for receiving the sun's radiation passing through the central opening and for redirecting the sun's radiation to the underside of the water conducting coil while the other rays of the sun directly strike the top side of the coil at the same time. The drive mechanism is controlled by an electrical circuit including means for selectively energizing the mechanism at predetermined hours of the day so as to provide the sun-following feature.

Therefore, it is among the primary objects of the present invention to provide a novel solar heating apparatus or system which is easy and economical to manufacture, a structure which is convenient to install and operate, and a construction which is highly efficient and dependable in operation.

Still another object of the present invention is to provide a novel solar heating construction having a heat collection means for collecting heat from the sun and subjecting the collected heat to water flowing through a conical coil array or courses of ducts wherein the courses or ducts are simultaneously exposed from the top and bottom to the sun's rays.

Still a further object of the present invention is to provide a novel water heater system employing solar energy and having means for subjecting the radiation collector to a maximum of sun's rays while incorporating drive means for tracking the sun's course overhead.

BRIEF DESCRIPTION OF THE DRAWINGS

The features of the present invention which are believed to be novel are set forth with particularity to the appended claims. The present invention, both as to its organization and manner of operation, together with further objects and advantages thereof, may best be understood by reference to the following description, taken in connection with the accompanying drawings in which:

FIG. 3 is an enlarged transverse cross sectional view of the solar heater shown in FIG. 1; and FIG. 4 is a schematic drawing of an electrical circuit for moving the solar heater so that it is perpendicular to the rays of the sun.

DESCRIPTION OF THE PREFERRED EMBODIMENT

Figure 1:
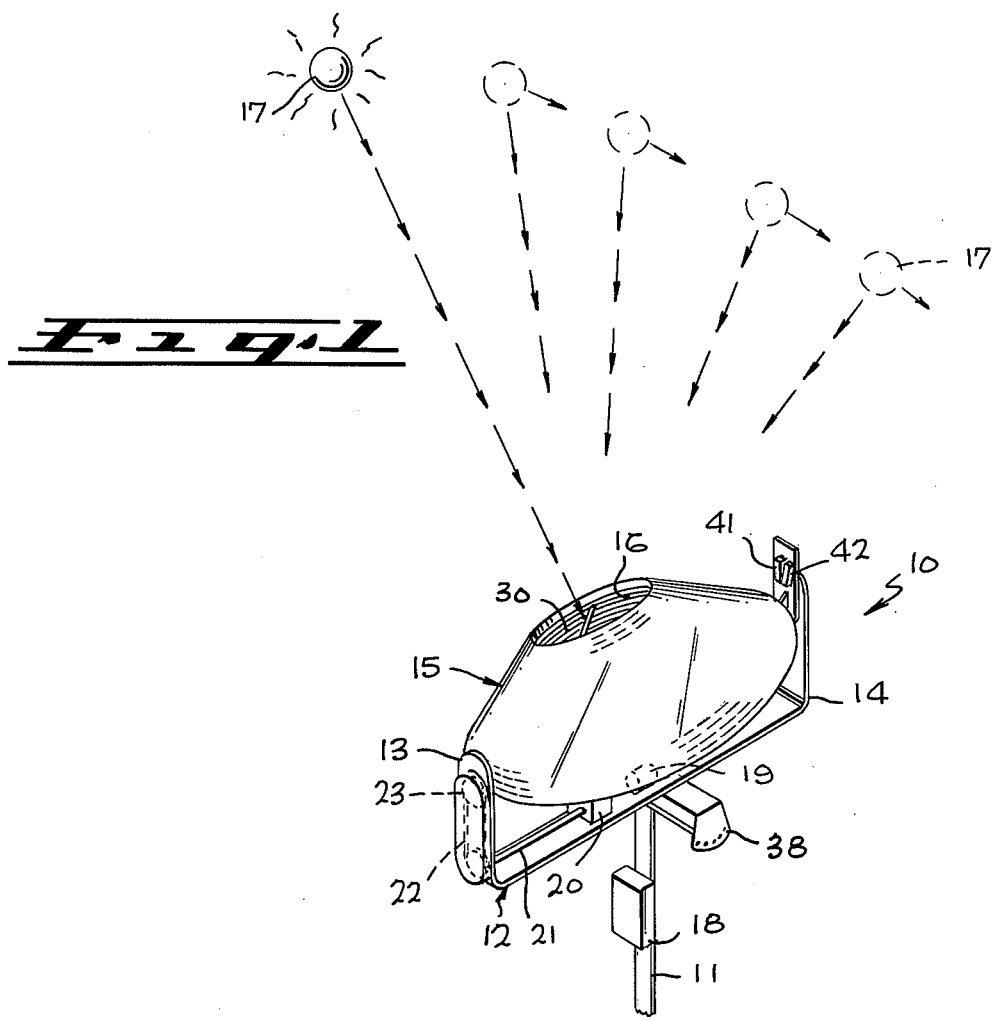
FIG. 1 is a perspective view of the novel solar heater of the present invention illustrating its ability to track sun location.

Referring now to FIG. 1, the novel solar water heating apparatus of the present invention is illustrated in the general direction of arrow 10 which includes an upright stanchion 11 for supporting the apparatus on the roof of the dwelling or on the ground. The upper end of the stanchion 11 includes a u-shaped member 12 having upright end pieces 13 and 14 which support the solar ray collector of the present invention between the opposing surfaces thereof. In the present instance, the solar ray collector is broadly identified by the numeral 15 which includes a plurality of courses or coils of a heat exchanger taking the form of a coil or tube. The coil or tube is arranged in a conical array so as to define a central opening 16 at one end through which rays from the sun 17 may readily pass through the array towards the frame 12. The solar ray collector 15 is intended to receive solar radiation from the sun 17 except for those rays which pass through the opening 16. Therefore it can be seen that solar radiation is directed to impinge against the top side of the tubular courses and that solar radiation is introduced inside the array where the sun's rays are redirected by a mirror (to be described later) against the underside of the tubular courses.

It is to be understood that the solar radiation or energy collector 15 moves westwardly with the sun starting at a pre-selected starting time through the use of a time clock which, in turn, energizes a solid state electronic timing module. The time clock and the timing module may be contained within an electric controlled panel 18 and may be employed for selectively energizing a drive motor 19. The drive motor 19 operates a speed reduction mechanism 20 that moves an output shaft 21. The output shaft 21 operates a chain drive 22 which is connected to the solar collector 15 via a frame movably attached to a gear wheel 23. The timing module within the control box 18 provides movement for the heat transfer or solar energy collector coils by energizing the motor 19 through a relay in an electrical circuit to be described later. The timing module assures that the array of solar radiation or collection coils supported by the frame will be perpendicular to the rays of the sun throughout its westward travel. Westward travel is indicated by the sequence of sun movement represented by the dotted or broken lines. Once the pre-selected time on the aforementioned time clock has been set, the movement of the solar collector will commence and continue until it is reversed at the end of westward travel. This cessation of movement and reverse travel is accomplished by energizing a second relay which in turn reverses the drive motor instantly so that the solar collector coils move in an easterly direction until striking a pre-set limit switch which de-energizes the motor to bring the collector to a rest position. The following day, the process is repeated.

Figure 2:
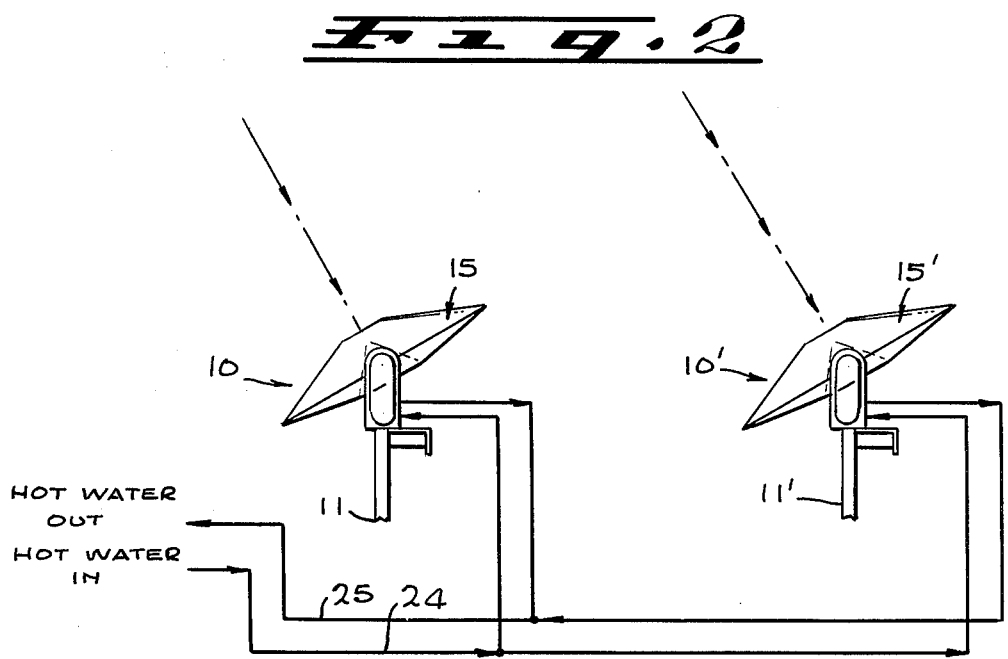
FIG. 2 is a schematic drawing of the solar heater employed in a tandem or multiple arrangement.

Referring now to FIG. 2, it can be seen that the solar heating apparatus of the present invention may be arranged in tandem or in any suitable multiples in either a series or parallel relationship so that the flow of water may be increased or so that the water may be superheated by multiple heat transfer units. The solar heating apparatus shown in FIG. 1 is identified by numeral 10 in FIG. 2 and the multiple is identified by the numeral 10 prime. It is understood that the unit 10 prime is identical in construction and operation to the unit identified by numeral 10. Furthermore, the collector 15 associated with the apparatus 10 is identical and identified by numeral 15 prime with respect to the device or apparatus 10 prime. It can also be seen in this latter figure that each of the respective solar heating units is connected so that the ends of the tubular coil 15 are respectively connected to a cold water input identified by numeral 24 and a hot water output identified by the numeral 25.

Referring now in detail to FIG. 3, an enlarged cross sectional view of the solar heating unit is illustrated wherein the solar collector 15 includes a tubular coil 30 which forms a frusto-conical shape by providing a plurality of tube courses through which water is conducted. The spiral tube or plurality of coiled courses provides a conical array serving as a heat exchanger so that the solar energy impinging against the tube will convert to increase the temperature of water conducted by the coils. A dust collector 31 is disposed over the top of the coils; however, it is to be understood that the cover 31 does not impede the solar radiation. The conical array and the cover 31 are carried on a frame 32 which is movably carried between the end pieces 13 and 14 of the frame 12 by rotating mounts 32' and 33 respectively. Therefore, as the motor 19 drives the solar collector 15 via chain drive 22 and the pivotal mounts 32' and 33, the collector may readily follow the course of the sun in the westerly direction.

A pair of inlet and outlet tubes 34 and 35 are connected to the cold water input 24 and the hot water output 25 respectively. The opposite ends of the flexible conduits 34 and 35 are coupled to the opposite ends of a manifold 36 supplying water to the course of tubular coils 30 and further operate to conduct heated water therefrom.

A feature of the present invention provides a conical mirror 37 which is carried on the center of the frame 32 immediately beneath the central opening 16 so as to directly receive sun rays passing through the opening. The sun rays are then redirected to the underside of the tubular coils 30 where heat transfer relationship takes place with the water being conducted therethrough. In this fashion, a major improvement is experienced over the prior art devices in that the water conducting tube or courses are subjected to solar radiation from the top and the underside simultaneously. To achieve this relationship, the mirror may be described as being of a circular parabolic shape which conforms to the opposing undersurface of the conical arrangement of water conducting coils 30. Since both the mirror 37 and the coils 30 are carried on the frame 32, the mirror will travel as the solar collector 15 is moved on the frame 12.

Inasmuch as the position of the sun with respect to the solar heating apparatus will be different depending on the month of the year, a monthly position selector 38 is provided which employs a plurality of holes 39 spaced apart at pre-determined degrees of a circle or arc. A pin connection is employed with respect to stanchion 11 so that the apparatus may be pivoted about pivot 40 and when the apparatus is at a selected position, the pin may be inserted through a respective hole alignment of hole 39 with a mating hole in the stanchion 11. Although the monthly position selector is mechanical, it is to be understood that automatic monthly selector position may be employed. Another compensating or selection device is represented by a pair of infrared sensing devices 41 and 42 which act as a fine positioning compensator at start up time in the morning and throughout the day. A pair of limit switches 50 and 51 may be employed for reversing the direction of solar collector 15 rotation as previously mentioned.

Referring now to FIG. 4, an electrical schematic drawing is shown for energizing motor 19 into moving the solar collector 15 in a manner to follow the movement and direction of the sun 17. In the schematic shown, line voltage is provided at terminals 44 and 45 so that time clock 46 is energized. Contact closures 47, 48 and 49 are operated by the clock 46 and it is noted that contact closures 47 and 49 are normally open while contact closure 48 is normally closed. Furthermore, it is noted that in the time clock closure circuit forward limit switch 50 is normally closed and reverse limit switch 51 is normally closed. Relay 52 is the forward relay which operates normally open contacts 53 and 54 while relay 55 is the reverse relay and operates normally open contacts 56 and 57. When the contact 53 and 54 are closed, the motor 19 operates to rotate the solar collector in a counter clockwise direction which may be referred to as forward from morning towards afternoon and evening while the closure of contacts 56 and 57 reverse the solar collector movement in a counter clockwise direction so that the collector will be in a position to receive rays from the morning sun. During the clockwise rotation of the solar collector 15, a timing module 58 sequences the forward or counter cloclwise rotation in a manner to assure that the rotation speed will not exceed the movement of the sun so that the collector will be perpendicular to the sun throughout its westward travel. The forward timing module 58 comprises a lapse time section capable of running from 0-300 seconds and a drive time section running from 0-3 seconds. The motor 19 operates for about 1 second so that the solar ray collector 15 moves forward approximately 1° every 4 minutes. The 0-300 second lapse time section energizes the contact closures every 3 minutes and 59 seconds at which time, the 0-3 second drive time section closes. Then the next or 60th second energizes the coil and close contacts in the 0-3 second drive time section to energize the foward motor as described.

In an actual sequence, it is assumed that the solar collector 15 has been returned to its starting position in the morning and that the time clock has traveled to a point where it will close contact closures 47. This action will energize forward relay 52 and effect the closure of contacts 53 and 54 to energize motor 19 in a clockwise direction. The speed is controlled by the forward timing module 58 and contact closures 48 will open so that the only circuit closed and energized is that circuit through the forward relay 52. Towards the end of afternoon or evening, the solar collector 15 will move with respect to its frame and operate limit switch 50 so that its contact will open to de-energize the forward relay. At this time, the contact closured 47 will open and the contact closure 48 will close so as to energize the reverse relay 55. Since the forward relay 52 is de-energized, forward relay contact 53 and 54 open to de-energize motor 19. However, energization of relay 55 causes contacts 56 and 57 to close so that the motor is energized so as to rotate the solar collector in a counter clockwise direction. No speed control is associated with the reversing movement so that the solar collector rotates rapidly towards a starting position where it will be available to intercept rays from the sun in the following morning. As the counter clockwise rotation of the solar collector continues, limit switch 51 is operated so that its contact closure opens to de-energize the reverse relay 55. This action de-energizes the motor 19 by opening contacts 56 and 57 and the entire system is idle pending further rotation of the time clock 46 so that it again alternately closes and then opens contacts 47 and 48.

To augment the system so that it will be capable of operating when the sun is available, the infrared sensors 41 and 42 may operate the normally open contacts 60 and 61 respectively. These latter contacts operate in conjunction with normally open contacts of the time clock and alternately energize or de-energize the forward and reverse relays 52 and 55 respectively. The infrared sensors serve as a fine adjust or tune wherein one operates in cooperation with the reverse movement of the motor and the other cooperates with the forward mode of operation. The longitudinal axis of the pair of sensors 41 and 42 are approximately 5° apart and when the solar collector it not perpendicular to the sun then either one or the other of sensors operates to override the drive system. When the timer is functioning, the sensors either speed up or retard the tilting speed. Associated in the circuit is an intake water valve 62 which may be employed for automatically controlling the flow of water within the tubular coils 30.

From the foregoing, it can be seen that the solar collector and heater apparatus of the present invention provides an extremely easy and economical unit to manufacture and one which is highly effective and dependable in operation. The solar heating construction is light in weight, neat and compact and is such that it can be readily and conveniently installed and put into service or taken out of service and stored away without the exercise of any extra ordinary or special skill. By means of the electrical sensors, relays and contact closures, operation of the water flow through the system is controlled as well as maximum interception of the sun's rays so that impingement of the rays occurs simultaneously underneath and on top of the water conducting coiled pipes.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A water heater utilizing solar energy comprising in combination:
   a frame;
   a conduit for carrying water forming a frusto-conical circular array of coils defining a central opening for conducting solar energy therethrough;
   a parabolic mirror coaxial with the axis of said array of coils carried on said frame beneath said array of coils and coaxially disposed with respect to said central opening for receiving the solar energy passing therethrough,
   said parabolic mirror having an exposed outer surface effective to redirect the solar energy upwardly against the underside of said array of coils while other solar energy is simultaneously striking the top side of said array of coils;
   means for positioning said array of coils to follow the track of the sun so that the solar energy is perpendicular to said array of coils;
   infrared sensors for controlling the positioning means in response to solar energy; and
   a limit switch disposed at the opposite ends of said array of coils positioning for reversing the direction of travel thereof.

2. The invention as defined in claim 1 including a transparent cover disposed over said array of coils and a common manifold inter connecting said array of coils to a source of pressurized water.

3. A water heater utulizing solar energy comprising in combination:
   a frame;
   a conduit for carrying water forming a frusto-conical circular array of coils defining a central opening for conducting solar energy therethrough;
   a parabolic mirror coaxial with the axis of said array of coils carried on said frame beneath said array of coils and coaxially disposed with respect to said central opening for receiving the solar energy passing therethrough;
   said parabolic mirror having an exposed outer surface effective to redirect the solar energy upwardly against the underside of said array of coils while other solar energy is simultaneously striking the top side of said array of coils;
   motor means operatively coupled to said frame for driving said array of coils and said mirror in a tilting direction so as to maintain the central axis of said array of coils perpendicular to the sun;
   said motor means includes:
   a pair of infrared sensors having their longitudinal axis located approximately 5° apart; and means responsive to either one of said pair of sensors for advancing or retarding the speed of tilting said array of coils when said perpendicular relationship is not maintained.

4. A water heater utilizing solar energy comprising in combination:

a frame;

a conduit for carrying water forming a frusto-conical circular array of coils defining a central opening for conducting solar energy therethrough;

a parabolic mirror coaxial with the axis of said array of coils carried on said frame beneath said array of coils and coaxially disposed with respect to said central opening for receiving the solar energy passing therethrough;

said parabolic mirror having an exposed outer surface effective to redirect the solar energy upwardly against the underside of said array of coils while other solar energy is simultaneously striking the top side of said array of coils;

motor means operatively coupled to said frame for driving said array of coils and said mirror in a tilting direction so as to maintain the central axis of said array of coils perpendicular to the sun;

a timing module for adjusting the speed of rotation of said array of coils including a lapse time section operatively coupled to a drive time section for driving said motor means at a predetermined rate.

* * * * *